United States Patent
Bullock et al.

(10) Patent No.: US 8,635,561 B1
(45) Date of Patent: Jan. 21, 2014

(54) SYSTEM AND METHOD FOR SORTING ELECTRONIC DOCUMENTS

(75) Inventors: Nathan Bullock, Kitchener (CA); Daniel Scott Brotherston, Kitchener (CA)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/399,345

(22) Filed: Feb. 17, 2012

(51) Int. Cl.
*G06F 17/00* (2006.01)

(52) U.S. Cl.
USPC .......................................... 715/863; 715/255

(58) Field of Classification Search
USPC .................................. 715/255, 863
See application file for complete search history.

(56) References Cited

U.S. PATENT DOCUMENTS

2008/0094371 A1* 4/2008 Forstall et al. ................ 345/173
2009/0307188 A1* 12/2009 Oldham et al. .................. 707/3

* cited by examiner

*Primary Examiner* — Doug Hutton, Jr.
*Assistant Examiner* — Andrew McIntosh
(74) *Attorney, Agent, or Firm* — Troutman Sanders LLP; James E. Schutz; Jay R. Anderson

(57) ABSTRACT

A method, computer program product, and computer system for sorting electronic documents. A first portion of a first electronic document and a second portion of a second electronic document are displayed on a device screen, where the first portion and the second portion are simultaneously displayed in a first display mode of an interface. A larger portion of the first electronic document is displayed on the device screen, where the larger portion of the first electronic document is displayed in a second display mode of the interface. A first input from a user is detected while displaying the larger portion of the first electronic document in the second display mode of the interface. In response to detecting the first input from the user while displaying the larger portion of the first electronic document in the second display mode of the interface, the first electronic document is sorted.

21 Claims, 5 Drawing Sheets

Subject: Reminder Mandatory Meeting   102
From: John Smith
To: Jane Doe

Jane,

Please remember that there is a mandatory meeting today to go over the earnings report. The meeting room has been changed from room 1103 to room 2010.

Also, please remember that you must bring two separate copies for each person in the meeting.

If you have any questions, please respond by 11 a.m. EST.

Sincerely,

John Smith

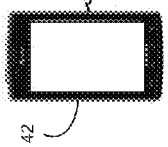

FIG. 5

SYSTEM AND METHOD FOR SORTING ELECTRONIC DOCUMENTS

TECHNICAL FIELD

This disclosure relates to display systems and methods and, more particularly, to electronic document sorting systems and methods.

BACKGROUND

The ability to receive electronic documents, e.g., email, on a mobile device (e.g., smart phone, tablet, etc.) is greatly advantageous. It allows, for example, important communications to be sent from one or more people to one or more other people without the delay associated with, e.g., email received via a desktop computer, such as waiting for the email recipient to be at their desktop computer to access the email. However, some communications may not be as important as others. For example, an email from one's co-worker may have a higher priority over an email advertisement (e.g., spam) or chain letter.

Due to, for example, the increasing number of emails received daily, prioritizing and sorting through each email is generally slow and cumbersome. For instance, one technique to sort through emails is to fully open each email in a "conversation view" so that the importance of its content may be determined. In the conversation view, multiple actions may be used to navigate through the email (e.g., scroll up/down/left/right, etc.) and multiple actions may be assigned to the fully opened email, such as deleting, archiving, labeling, etc. However, a noted disadvantage of this technique is that fully opening an email typically requires all of the information (e.g., content) in that email to be retrieved from an email server. Due at least to, e.g., the limited bandwidth and/or processing resources of some mobile devices, fully retrieving an email may require a delay to the user while the information is being retrieved. This may become frustrating to the user who typically expects real time access to information.

Another technique to sort through emails is to have a "thread view" or "subject view" where very small amounts of the subject, content, or "snippets" of multiple emails may be seen on the mobile device screen at the same time. However, a noted disadvantage of this technique is that due to the small viewing areas on many mobile devices, the limited content displayed is generally not enough to accurately determine the importance of the email. Another noted disadvantage is that, generally, before the user may assign the action for the email, the user may have to perform multiple inputs (e.g., gestures) to determine on which email the action is to be performed. This requirement may slow down the user. As such, there remains a need for a faster and more efficient way to sort through one's email.

SUMMARY OF DISCLOSURE

In one implementation, a method for electronic document sorting, performed by one or more computing devices, comprises displaying a first portion of a first electronic document and a second portion of a second electronic document on a device screen, where the first portion and the second portion are simultaneously displayed in a first display mode of an interface. A larger portion of the first electronic document is displayed on the device screen, where the larger portion of the first electronic document is displayed in a second display mode of the interface. A first input from a user is detected while displaying the larger portion of the first electronic document in the second display mode of the interface. In response to detecting the first input from the user while displaying the larger portion of the first electronic document in the second display mode of the interface, the first electronic document is sorted.

One or more of the following features may be included. The first input may include but is not limited to at least one of an upward swipe gesture, a downward swipe gesture, a left swipe gesture, a right swipe gesture, and a diagonal swipe gesture. Sorting the first electronic document may include but is not limited to displaying, on the device screen, a second larger portion of the second electronic document, where the second larger portion of the second electronic document is displayed in the second display mode of the interface. Sorting the first electronic document may include but is not limited to at least one of deleting the first electronic document, archiving the first electronic document, and marking the first electronic document.

Displaying the larger portion of the first electronic document may include but is not limited to displaying the second portion of the second electronic document with the larger portion of the first electronic document, where the second portion of the second electronic document is smaller than the larger portion of the first electronic document. Full display of the first electronic document may be enabled in a third display mode in response to detecting a second input from the user while displaying the larger portion of the first electronic document in the second display mode of the interface. In response to detecting a third input from the user while the full display of the first electronic document is enabled, the second display mode may be returned to from the third display mode.

In another implementation, a computer program product resides on a computer readable medium that has a plurality of instructions stored on it. When executed by a processor, the instructions cause the processor to perform operations comprising displaying a first portion of a first electronic document and a second portion of a second electronic document on a device screen, where the first portion and the second portion are simultaneously displayed in a first display mode of an interface. A larger portion of the first electronic document is displayed on the device screen, where the larger portion of the first electronic document is displayed in a second display mode of the interface. A first input from a user is detected while displaying the larger portion of the first electronic document in the second display mode of the interface. In response to detecting the first input from the user while displaying the larger portion of the first electronic document in the second display mode of the interface, the first electronic document is sorted.

One or more of the following features may be included. The first input may include but is not limited to at least one of an upward swipe gesture, a downward swipe gesture, a left swipe gesture, a right swipe gesture, and a diagonal swipe gesture. Sorting the first electronic document may include but is not limited to displaying, on the device screen, a second larger portion of the second electronic document, where the second larger portion of the second electronic document is displayed in the second display mode of the interface. Sorting the first electronic document may include but is not limited to at least one of deleting the first electronic document, archiving the first electronic document, and marking the first electronic document.

Displaying the larger portion of the first electronic document may include but is not limited to displaying the second portion of the second electronic document with the larger portion of the first electronic document, where the second portion of the second electronic document is smaller than the larger portion of the first electronic document. Full display of the first electronic document may be enabled in a third display mode in response to detecting a second input from the user while displaying the larger portion of the first electronic document in the second display mode of the interface. In response to detecting a third input from the user while the full display of the first electronic document is enabled, the second display mode may be returned to from the third display mode.

In another implementation, a computing system includes a processor and memory configured to perform operations comprising displaying a first portion of a first electronic document and a second portion of a second electronic document on a device screen, where the first portion and the second portion are simultaneously displayed in a first display mode of an interface. A larger portion of the first electronic document is displayed on the device screen, where the larger portion of the first electronic document is displayed in a second display mode of the interface. A first input from a user is detected while displaying the larger portion of the first electronic document in the second display mode of the interface. In response to detecting the first input from the user while displaying the larger portion of the first electronic document in the second display mode of the interface, the first electronic document is sorted.

One or more of the following features may be included. The first input may include but is not limited to at least one of an upward swipe gesture, a downward swipe gesture, a left swipe gesture, a right swipe gesture, and a diagonal swipe gesture. Sorting the first electronic document may include but is not limited to displaying, on the device screen, a second larger portion of the second electronic document, where the second larger portion of the second electronic document is displayed in the second display mode of the interface. Sorting the first electronic document may include but is not limited to at least one of deleting the first electronic document, archiving the first electronic document, and marking the first electronic document.

Displaying the larger portion of the first electronic document may include but is not limited to displaying the second portion of the second electronic document with the larger portion of the first electronic document, where the second portion of the second electronic document is smaller than the larger portion of the first electronic document. Full display of the first electronic document may be enabled in a third display mode in response to detecting a second input from the user while displaying the larger portion of the first electronic document in the second display mode of the interface. In response to detecting a third input from the user while the full display of the first electronic document is enabled, the second display mode may be returned to from the third display mode.

The details of one or more implementations are set forth in the accompanying drawings and the description below. Other features and advantages will become apparent from the description, the drawings, and the claims.

BRIEF DESCRIPTION OF THE DRAWINGS

FIG. 5 is an illustrative diagrammatic view of a screen image displayed by the electronic document sorting process of FIG. 1.

Like reference symbols in the various drawings indicate like elements.

DETAILED DESCRIPTION OF THE EMBODIMENTS

Figure 1:
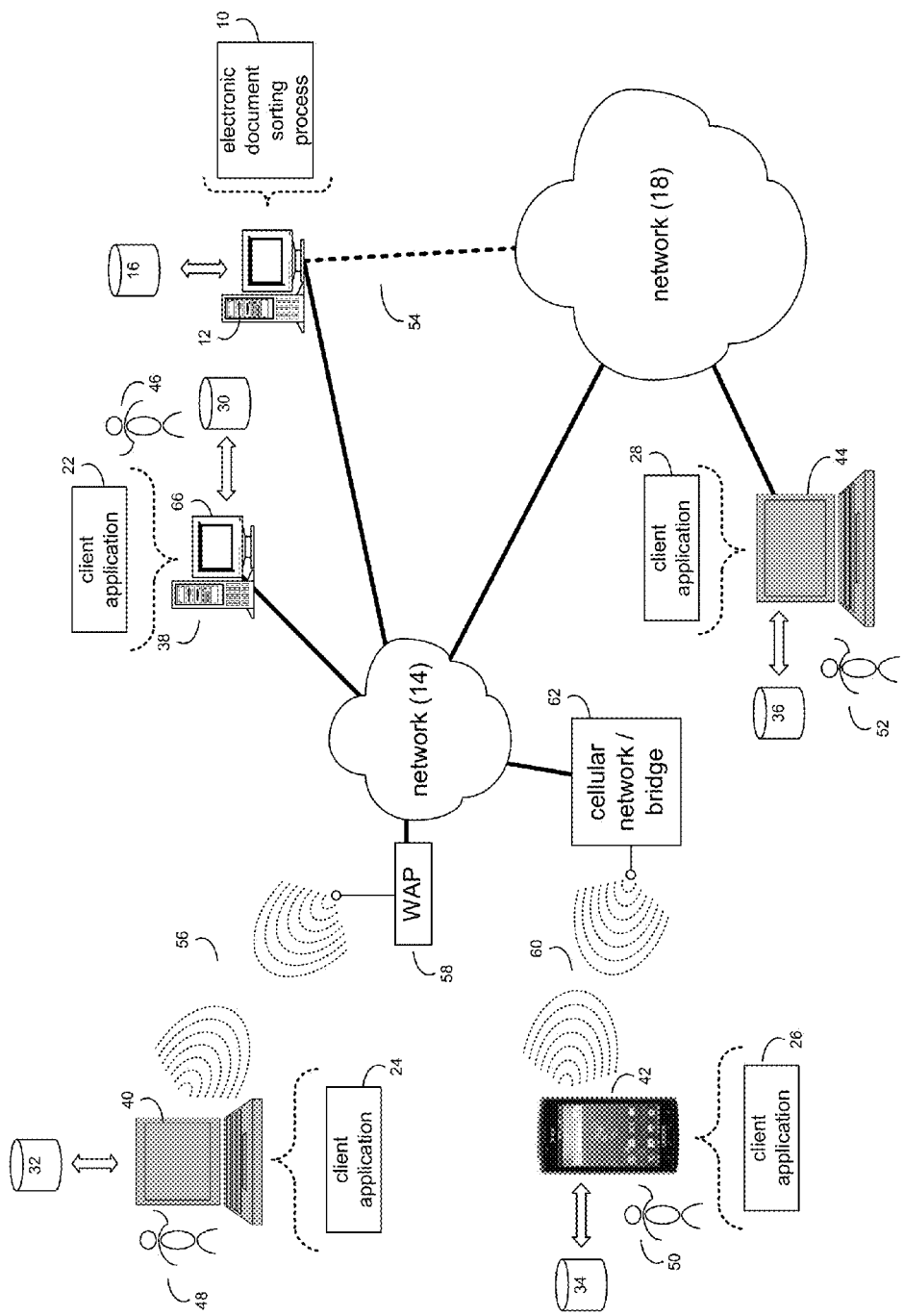
FIG. 1 is an illustrative diagrammatic view of an electronic document sorting process coupled to a distributed computing network.
Figure 2:
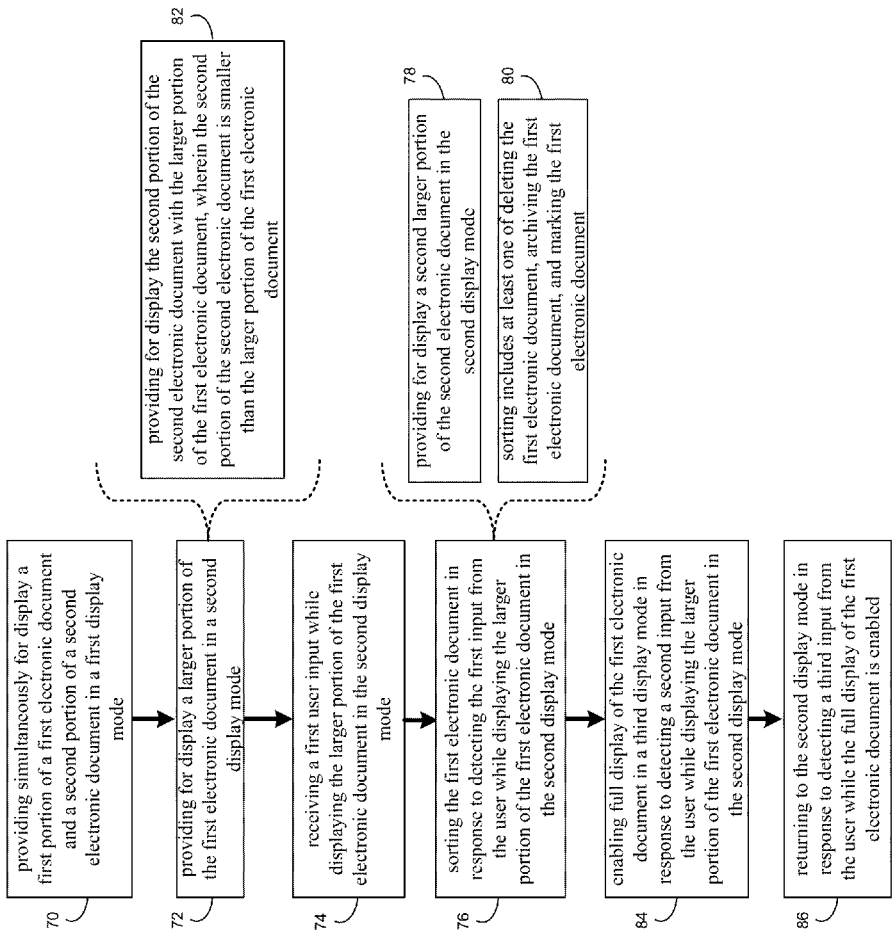
FIG. 2 is an illustrative flowchart of the electronic document sorting process of FIG. 1.

System Overview:

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or combinations thereof.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to FIG. 1, there is shown an electronic document sorting process 10 that may reside on and may be executed by computer 12, which may be connected to network 14 (e.g., the Internet or a local area network). Examples of computer 12 may include but are not limited to a single server computer, a series of server computers, a single personal computer, a series of personal computers, a mini computer, a tablet computer, a mainframe computer, or a computing cloud. The various components of computer 12 may execute one or more operating systems, examples of which may include but are not limited to: Microsoft Windows Server™; Novell Netware™; Redhat Linux™, Unix, or a custom operating system, for example.

As will be discussed below in greater detail, electronic document sorting process 10 may display a first portion of a first electronic document and a second portion of a second electronic document on a device screen, where the first portion and the second portion may be simultaneously displayed in a first display mode of an interface (e.g., graphical user interface). A larger portion of the first electronic document may be displayed on the device screen, where the larger portion of the first electronic document may be displayed in a second display mode of the interface. A first input from a user may be detected while displaying the larger portion of the first electronic document in the second display mode of the interface. In response to detecting the first input from the user while displaying the larger portion of the first electronic document in the second display mode of the interface, the first electronic document may be sorted.

The instruction sets and subroutines of electronic document sorting process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Electronic document sorting process 10 may be accessed via client applications 22, 24, 26, 28. Examples of client applications 22, 24, 26, 28 may include but are not limited to a standard web browser, email client application, a customized web browser, or a custom application. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, notebook computer 44, a tablet (not shown), a server (not shown), a data-enabled, cellular telephone (not shown), and a dedicated network device (not shown).

One or more of client applications 22, 24, 26, 28 may be configured to effectuate some or all of the functionality of electronic document sorting process 10. Accordingly, electronic document sorting process 10 may be a purely server-side application, a purely client-side application, or a hybrid server-side/client-side application that is cooperatively executed by one or more of client applications 22, 24, 26, 28 and electronic document sorting process 10.

Users 46, 48, 50, 52 may access computer 12 and electronic document sorting process 10 directly through network 14 or through secondary network 18. Further, computer 12 may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between laptop computer 40 and WAP 58. Smart phone 42 is shown wirelessly coupled to network 14 via wireless communication channel 60 established between smart phone 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows, e.g., mobile phones, computers, and smart phones to be interconnected using a short-range wireless connection.

Client electronic devices 38, 40, 42, 44 may each execute an operating system, examples of which may include but are not limited to Apple iOS™, Microsoft Windows™, Android™, Redhat Linux™, or a custom operating system.

The Electronic Document Sorting Process:

As discussed above and referring also to FIGS. 2-5, electronic document sorting process 10 may provide 70 display a first portion 92 of a first electronic document 90 and a second portion 96 of a second electronic document 94 on a device 42 screen 88, where the first portion 92 and the second portion 96 may be simultaneously provided 70 for display in a first display mode 100 of an interface 102. A larger portion 292 of the first electronic document 90 may be provided 72 for display on the device 42 screen 88, where the larger portion 292 of the first electronic document 90 may be provided 72 for display in a second display mode 200 of the interface 102. A first input from a user may be received 74 while providing 72 for display the larger portion 292 of the first electronic document 90 in the second display mode 200 of the interface 102. In response to receiving 74 the first input from the user while providing 72 for display the larger portion 292 of the first electronic document 90 in the second display mode 200 of the interface 102, the first electronic document 90 may be sorted 76.

As noted above, electronic document sorting process 10 may, e.g., initially, provide 70 for display a first portion 92 of a first electronic document 90 and a second portion 96 of a second electronic document 94 on a device 42, e.g., smart phone, screen 88. Illustratively, the electronic document is an electronic mail (email), however, those skilled in the art will recognize that other forms of electronic documents, such as a word document, a pdf, image, etc., may also be used. As such, the use of an email should be taken as exemplary only and not to otherwise limit the scope of the disclosure. The first portion 92 and the second portion 96 may be simultaneously provided 70 for display in a first display mode 100 of an interface 102 (e.g., graphical user interface, API, etc.). The first display mode 100 may be, for example, a thread display/view, where, in the case of an email, a small portion of the email, e.g., a "snippet" of the information/content of the email, may be visible via screen 88 of device 42. Additional information/content, such as the subject line and/or the "to/from" line, may also be visible in the first display mode 100. The terms information and content may be used interchangeably where appropriate to denote the respective visible portions of the electronic documents, e.g., 90 and 94 and/or metadata associated with the respective electronic documents 90 and 94.

Figure 3:
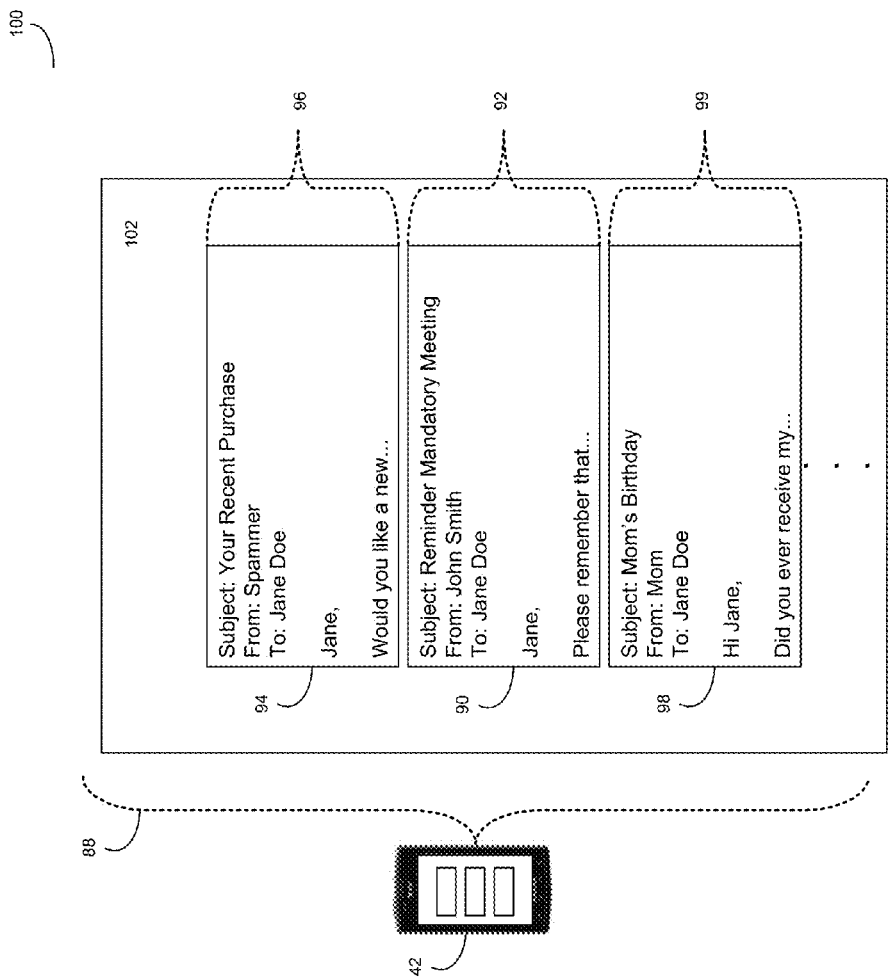
FIG. 3 is an illustrative diagrammatic view of a screen image displayed by the electronic document sorting process of FIG. 1.
Figure 4:
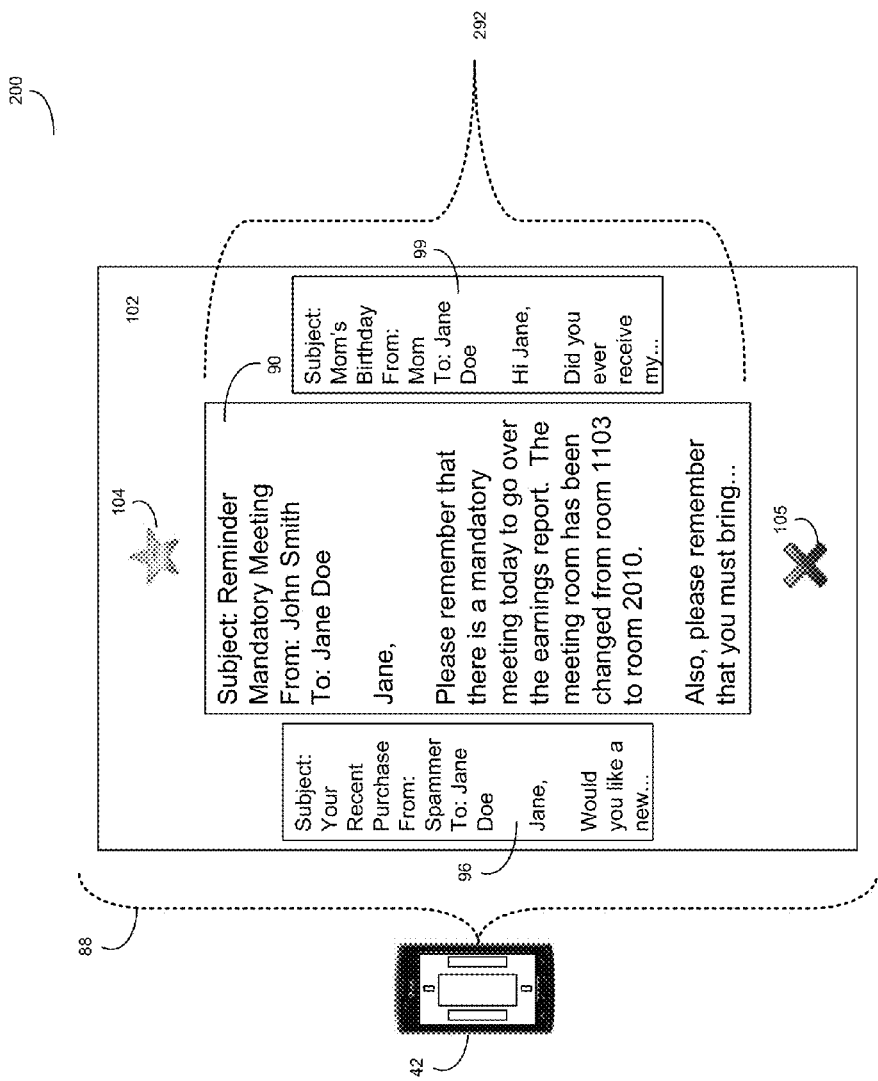
FIG. 4 is an illustrative diagrammatic view of a screen image displayed by the electronic document sorting process of FIG. 1.

While only three electronic documents are displayed at least in FIG. 3, those skilled in the art will recognize that the number of electronic documents may vary depending upon, for example, the size of screen 88 of device 42 and the number of electronic documents concurrently available on the device 42. Thus, the display of only three electronic documents should be taken as exemplary only. Those skilled in the art will also recognize that more or less information may also be displayed in the first display mode 100 depending on, for example, the size of screen 88 of device 42, as well as pre-set limits on the amount of data (and/or metadata) and/or information retrieved for each electronic document from, e.g., server 12, such as an email server. According to an illustrative embodiment, whether or not at least a portion of the information has already been retrieved from server 12 and stored to, e.g., the device 42 memory 34, more or less information may also be displayed in the first display mode 100 depending on, for example, pre-set limits on the amount of data and/or information retrieved from the memory 34 of device 42. Illustratively, the size of, e.g., the text characters, as well as other differences between the information of each electronic document, may affect the amount of data and/or information retrieved.

Alternatively, the additional content (e.g., the subject line and/or the "to/from" line) may have its own pre-set limit on the amount of data and/or information retrieved and/or provided 70, 72 for display. For example, the pre-set limit on the amount of data and information displayed in at least display modes 100 and 200 may, but need not, take into account two pre-set limits (e.g., a first pre-set limit of the amount of data and/or information in the body of the electronic document, in addition to a second pre-set limit of the amount of data and/or information in the additional content). For instance, the provided 70 for display portion 92 of the electronic document 90 may be greater if the second pre-set limit of the additional content is not considered part of the first pre-set limit, or may be less if the second pre-set limit of the additional content is considered part of the first pre-set limit. As can be appreciated by one skilled in the art, other circumstances that effect how much data and/or information is displayed are also possible.

According to an illustrative embodiment, a larger portion 292 of the first electronic document 90 may be provided 72 for display in a second display mode 200 of the interface 102 on the device 42 screen 88. Larger portion 292 of the first electronic document 90 may illustratively include more information of the first electronic document 90 than the first portion 92 of the first electronic document 90. For example, if only the subject line, to/from line, and the first two content lines of the electronic document are provided 70 for display in the first display mode 100, then more than that amount of information may be provided 72 for display in the second display mode 200. As another example, the first portion 92 of the first electronic document 90 plus a second portion of the first electronic document 90 may be considered be more information. The larger portion 292 may also be considered an "expanded" snippet of the first portion 92 of the first electronic document. Notably, the ability of the second display mode 200 to provide 72 for display a larger portion 292 of the first electronic document 90 is to be distinguished by an ability of a third display mode 300 to fully view the first electronic document 90, as is discussed further below.

However, it is possible that the same amount of information would be displayed in at least the first and second mode, if, for example, the size of the entire amount of information is less than or equal to the pre-set limits on the amount of data and/or information retrieved, as discussed above. For example, assume the first electronic document 90 consists of thirty text characters. If the pre-set limit of the first display mode 100 is fifty text characters (e.g., with or without the subject line and/or the to/from line), the entire thirty text characters may be displayed. As such, the larger portion 292 of the first electronic document 90 provided 72 for display in the second display mode 200 may also include the entire thirty characters. In such a situation, larger portion 292 may not actually be larger, but would be capable of providing 72 for display a larger portion if available.

Providing 72 for display the larger portion 292 of the first electronic document 90 may include, but is not limited to, providing 82 for display the second portion 96 of the second electronic document 94 with the larger portion 292 of the first electronic document 90. This may be advantageous, for example, in that the second display mode 200 may combine certain aspects of the first display mode 100 to allow the user at least to see, in addition to the larger portion 292 of the first electronic document 90, the portion 96 of the previous electronic document (e.g., second electronic document 94), and/or a next portion 99 of the next electronic document (e.g., electronic document 98). Illustratively, the second portion 96 of the second electronic document 94 is smaller than the larger portion 292 of the first electronic document 90. Notably, while the second portion 96 is shown to be the same amount (e.g., size) of information in both FIG. 3 and FIG. 4, those skilled in the art will appreciate that the second portion 96 in FIG. 4 may be smaller or larger than the second portion 96 in FIG. 3. As such, the illustration of the second portion 96 being identical in both FIGS. 3 and 4 should be taken as exemplary only.

A first input from a user of device 42 may be received 74 or detected while providing 72 for display the larger portion 292 of the first electronic document 90 in the second display mode 200 of the interface 102. Illustratively, the screen 88 of mobile device 42 may include a touch screen. As such, the first input may include but is not limited to at least one of an upward swipe gesture, a downward swipe gesture, a left swipe gesture, a right swipe gesture, a diagonal swipe gesture, or other gesture, such as a brief "tap" on one or more icons 104, 105 (described in greater detail below) displayed on screen 88. Alternatively, mobile device 42 may also include one or more "buttons" (not shown) to receive at least the first input if mobile device 42 does not include a touch screen, or alternatively, the buttons may be located at a location other than the touch screen if mobile device 42 includes a touch screen and other buttons. Those skilled in the art will appreciate that any type of input may be used without departing from the scope of the disclosure.

In response to receiving 74 the first input from the user while providing 72 for display the larger portion 292 of the first electronic document 90 in the second display mode 200 of the interface 102, the first electronic document 90 may be sorted 76. Sorting 80 the first electronic document 90 may include, but is not limited to, at least one of deleting the first electronic document 90 (e.g., in response to detecting a downward diagonal swipe), archiving the first electronic document 90 (e.g., in response to detecting a downward swipe), marking (e.g., annotating) the first electronic document 90 to signify, for example, that the first electronic document has been dealt with or to signify that the user should come back to the first electronic document 90 (e.g., in response to detecting an upward swipe), moving to the next electronic document 98 (e.g., in response to detecting a left swipe), and moving to the previous electronic document 94 (e.g., in response to detecting a right swipe). Those skilled in the art will recognize that differing combinations of sorting actions may be used. For example, an upward swipe may denote or may be associated with deleting the first electronic document 90. As such, the description of the specific sorting actions denoting specific inputs should be taken as exemplary only and not to otherwise limit the scope of the disclosure. Those skilled in the art will also recognize that other sorting actions may be used in place of or in addition to those described herein. As such, the description of the specific sorting actions should be taken as exemplary only and not to otherwise limit the scope of the disclosure.

Similarly, second display mode 200 may, but need not include, one or more icons 104, 105 denoting what sorting action will occur in response to the first input. For example, icon 104 may denote that an upward swipe may, e.g., star the electronic document to mark (e.g., annotate) the electronic document as dealt with, or denote something else. Similarly, icon 105 may denote that a downward swipe may, e.g., delete the first document, archive the first document, or denote something else. According to one or more alternative embodiments, the user may also contact, e.g., "tap" icons 104, 105 respectively to perform the associated sorting action. Those skilled in the art will appreciate that other icon designs may be used in addition to or in place of icons 104, 105. As such, the specific use of a "star" and an "X" should be taken as exemplary only.

Sorting the first electronic document 90 may include, but is not limited to, providing 78 for display, on screen 88 of device 42, a second larger portion of the second electronic document 94, where the second larger portion of the second electronic document 94 is displayed in the second display mode of the interface. For example, assume that in FIG. 4, device 42 receives 74 the first input as an upward swipe while providing 72 for display the larger portion 292 of the first electronic document 90 in the second display mode 200, thereby, e.g., marking (e.g., annotating) the electronic document 90 as having been dealt with. In response, the second larger portion of the "next" electronic document (e.g., second electronic document 94) may then be displayed in place of the larger portion 292 of the first electronic document 90. Alternatively, the second larger portion of the "next" electronic document (e.g., second electronic document 98) may then be displayed in place of the larger portion 292 of the first electronic document 90.

According to an alternative embodiment, "full display" of the first electronic document 90 may be enabled 84 in a third display mode 300 of the interface in response to detecting a second input from the user while displaying the larger portion 292 of the first electronic document 90 in the second display mode 200 of the interface. For example, device 42 may detect a "tap" on the larger portion 292 of the first electronic document 90. In response to detecting the tap on the larger portion 292 of the first electronic document 90, the full display of the first electronic document 90 may be enabled 84 in a third display mode 300. The full display may allow the user to, e.g., scroll, to view any remaining portions of the first electronic document that is not displayed in the larger portion 292 of the first electronic document 90 in the second display mode 200. However, similarly as is noted above, it may be possible that the same amount of information would be displayed in at least the second and third mode, if, for example, the size of the entire amount of data and/or information is less than or equal to the pre-set limits on the amount of data and/or information retrieved for the second mode.

According to one or more illustrative embodiments, the ability to, e.g., scroll or otherwise view one or more remaining portions of the first electronic document that is not displayed in the larger portion 292 of the first electronic document 90 may not be possible in the second display mode 200. For example, the remaining portions may not yet have been retrieved from, e.g., memory of device 42 and/or a remote source. This lack of ability may be beneficial, as the remaining one or more portions (e.g., the entire electronic document) need not be retrieved, e.g., from a remote server. This may improve the real time ability to retrieve and view, for example, the larger portion 292 of the first electronic document 90, since, as noted above, not as much bandwidth and/or processing resources are being used to display more than the larger portion 292 of the first electronic document 90 in the second display mode 200. Eliminating the ability to scroll in the second display mode 200 may be additionally advantageous, for example, since the gestures typically mapped to navigating through documents, e.g., scroll left/right/up/down, are now free to be mapped to more common document sorting actions (e.g., next document, previous document, archive, star, delete, etc.). This may provide a more optimized document sorting environment.

According to one or more illustrative embodiments, the third display mode 300 may be returned 86 to the second display mode 200, e.g., in response to detecting a third input from the user while full display of the first electronic document 90 is enabled 84 in the third display mode 300. For example, detecting a received user input, e.g., "tapping" of the full display of the first electronic document 90, may change the third display mode 300 to the second display mode 200. Alternatively, tapping on the second portion 96 of the second electronic document 94 while in the second display mode 200 may change the second display mode 200 to the first display mode 100. As yet another alternative, tapping on the first portion 92 of the first electronic document 90 while in the first display mode 100 may change the first display mode 100 to the second display mode 200. Other such variations and combinations are also possible, e.g., where a detected input may change the first display mode 100 directly to the third display mode 300, and vice versa.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and combinations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications and/or combinations of embodiments as are suited to the particular use contemplated.

Having thus described the disclosure of the present application in detail and by reference to embodiments thereof, it will be apparent that modifications, variations, and combinations are possible without departing from the scope of the disclosure defined in the appended claims.

What is claimed is:

1. A method comprising:

receiving, by a processor, a plurality of email snippets, each respective email snippet from the plurality of email snippets being based on a respective email from a plurality of emails and each respective email snippet including a subject of the respective email, a sender of the respective email, and a respective portion of a body of the respective email, wherein the respective portion of the body of the respective email comprises, at most, a first predetermined maximum amount of the body of the respective email;

outputting, by the processor, and for simultaneous display at a touch-sensitive display:

an expanded view of a first snippet from the plurality of snippets, the first snippet being based on a first email from the plurality of emails, the expanded view including at least a portion of the subject of the first email, at least an indication of the sender of the first email, and an expanded portion of the body of the snippet of the first email, wherein the expanded portion comprises, at most, a second predetermined maximum amount of the body of the first email; and a condensed view of a second snippet from the plurality of snippets, the second snippet being based on a second email from the plurality of emails, the condensed view including at least a portion of the subject of the second email, at least an indication of the sender of the second email, and a condensed portion of the body of the snippet of the second email, wherein the condensed portion comprises, at most, a third predetermined maximum amount of the body of the second email; and receiving an indication of a single swipe gesture received at the touch-sensitive display;

responsive to determining that the gesture corresponds to one or more of deleting, archiving, and marking actions, sorting the first email based on the corresponding actions; and outputting, for display, an expanded view of the second snippet from the plurality of snippets in place of the expanded view of the first snippet from the plurality of snippets.

2. The method of claim 1, the second predetermined maximum amount being less than the first predetermined maximum amount.

3. The method of claim 1, the third predetermined maximum amount being less than the second predetermined maximum amount.

4. The method of claim 1, the first, second, and third predetermined maximum amounts each being amounts of characters.

5. The method of claim 1, the second predetermined maximum amount being approximately 160 characters.

6. The method of claim 1, the second predetermined maximum amount being two lines of text.

7. The method of claim 1, wherein, for the expanded view of the first snippet, the expanded portion comprises, at most, a second predetermined maximum amount minus an amount determined by a number of characters in one or more of the at least the portion of the subject and the at least the indication of the sender, of the body of the first email.

8. A system comprising:
a touch-sensitive display; and
a non-transitory memory coupled to a processor, and containing instructions that when executed by at least one processor cause the system to:
  receive, by a processor, a plurality of electronic document snippets, each respective electronic document snippet from the plurality of electronic document snippets being based on a respective electronic document from a plurality of electronic documents and including, at most, a first predetermined maximum amount of the electronic document;
  output, by the processor, and for simultaneous display at the touch-sensitive display:
    an expanded view of a first snippet from the plurality of snippets, the first snippet being based on a first electronic document from the plurality of electronic documents, the expanded view including, at most, a second predetermined maximum amount of the first electronic document; and
    a condensed view of a second snippet from the plurality of snippets, the second snippet being based on a second electronic document from the plurality of electronic documents, the condensed view including, at most, a third predetermined maximum amount of the second electronic document, the third predetermined maximum amount less than the second predetermined maximum amount; and
  receive an indication of a single swipe gesture received at the touch-sensitive display;
  responsive to determining that the gesture corresponds to one or more of deleting, archiving, and marking actions, sorting the first electronic document based on the corresponding actions; and
  output, for display, an expanded view of the second snippet from the plurality of snippets in place of the expanded view of the first snippet from the plurality of snippets.

9. The system of claim 8, the first electronic document and second electronic document being email documents, the respective snippets based on the first electronic document and second electronic document each including a subject of the respective email document, a sender of the respective email document, and a respective portion of a body of the email document.

10. The system of claim 8, the non-transitory memory containing instructions that further cause the system to:
output, for display, a condensed view of a third snippet from the plurality of snippets in place of the condensed view of the second snippet from the plurality of snippets.

11. A computer program product including a non-transitory computer readable medium having a plurality of instructions stored thereon which, when executed by at least one processor, cause the processor to perform operations comprising:
  receiving, by a processor, a plurality of email snippets, including a first email snippet and a second email snippet, each respective email snippet from the plurality of email snippets being based on a respective email from a plurality of emails and including a subject of the respective email, a sender of the respective email, and a respective portion of a body of the respective email, wherein the respective portion of the body of the respective email comprises, at most, a first predetermined maximum amount of the body of the respective email;
  determining, by the processor and for at least each snippet from the plurality of snippets that is output for display, an expanded view of the snippet, and a condensed view of the snippet,
    the expanded view of the respective snippet including at least a portion of the subject of the respective email, at least an indication of the sender of the respective email, and an expanded portion of the body of the snippet of the respective email, wherein the expanded portion comprises, at most, a second predetermined maximum amount of the body of the respective email; and
    the condensed view of the respective snippet including at least a portion of the subject of the respective email, at least an indication of the sender of the respective email, and a condensed portion of the body of the snippet of the respective email, wherein the second portion comprises, at most, a third predetermined maximum amount of the body of the respective email; and
  outputting, by the processor, and for simultaneous display at a touch-sensitive display:
    the expanded view for the first snippet, the first snippet based on a first email, and
    the condensed view for the second snippet, the second snippet based on a second email;
  receiving an indication of a gesture received at the touch-sensitive display, the gesture received at an area of the touch-sensitive display displaying the expanded view for the first snippet; and
  responsive to determining the gesture corresponds to one or more of deleting, archiving, and marking actions, sorting the first email based on the corresponding actions.

12. The method of claim 11, further comprising:
outputting, for display, the expanded view for the second snippet.

13. The method of claim 12, the expanded view for the second snippet output in place of the expanded view for the first snippet.

14. The method of claim 13, the received plurality of snippets including a third snippet based on a third email, the method further comprising:
outputting, for simultaneous display with the expanded view of the second snippet, the condensed view for the snippet of the third email.

15. The method of claim 14, the condensed view of the third snippet output for display in place of the condensed view for the second snippet.

16. The method of claim 13, further comprising:
outputting, for simultaneous display with the expanded view for the second snippet, the condensed view for the first snippet.

17. The method of claim 11, the second predetermined maximum amount being less than the first predetermined maximum amount.

18. The method of claim 11, the third predetermined maximum amount being less than the second predetermined maximum amount.

19. The method of claim 11, the first, second, and third predetermined maximum amounts each being amounts of 5 characters.

20. The method of claim 11, the second predetermined maximum amount being approximately 160 characters.

21. The method of claim 11 the second predetermined maximum amount being two lines of text.

* * * * *